United States Patent [19]

Hayati

[11] Patent Number: 4,826,392
[45] Date of Patent: May 2, 1989

[54] METHOD AND APPARATUS FOR HYBRID POSITION/FORCE CONTROL OF MULTI-ARM COOPERATING ROBOTS

[75] Inventor: Samad A. Hayati, Pasadena, Calif.

[73] Assignee: California Institute of Technology, Pasadena, Calif.

[21] Appl. No.: 845,991

[22] Filed: Mar. 31, 1986

[51] Int. Cl.$^4$ .............................................. B66C 1/00
[52] U.S. Cl. ...................................... 414/730; 901/9; 901/10; 318/625; 364/513
[58] Field of Search ................. 901/9, 10, 2; 414/730; 364/513; 318/568, 568 G, 574, 625

[56] References Cited

U.S. PATENT DOCUMENTS 3,890,552  6/1975  Devol et al. .................... 318/574 X

OTHER PUBLICATIONS

Orin, D. and Oh, S., "Control of Force Distribution in Robotic Mechanisms Containing Closed Kinematic Chains," *Transactions of the ASME*, vol. 102, Jun. 1981, pp. 134–141.

Ishida, T., "Force Control in Coordination of Two Arms," *Proceedings of the 5th International Conference on Artificial Intelligence*, pp.717–722, Aug. 1977.

Fujii, S. and Kurono, S., "Coordinated Computer Control of a Pair of Manipulators," *Fourth World Congress on the Theory of Machines and Mechanisms*, University of Newcastle Upon Tyne, Sep. 8–12, 1975.

Alford, C. O. and Belyen, S. M., "Coordinated Control of Two Robot Arms," *Proceedings of the International Conference on Robotics*, Atlanta, Geo., Mar. 13–15, 1984.

Mason, M. T., "Compliance and Force Control for Computer Controlled Manipulators," *IEEE Transactions on Systems, Man, and Cybernetics* SMC-11, Jun. 1981, pp. 418–432.

Raibert and Craig, "Hybrid Position/Force Control of Manipulator's," *ASME Journal of Dynamics Systems, Measurement and Control*, Jun. 1981.

Craig, J. J., *Introduction to Robotics: Mechanics and Control*, Addison-Wesley, 1985.

*Primary Examiner*—Robert J. Spar
*Assistant Examiner*—Jennifer L. Doyle
*Attorney, Agent, or Firm*—Jackson & Jones

[57] ABSTRACT

Two or more robotic arms having end effectors rigidly attached to an object to be moved are disclosed. A hybrid position/force control system is provided for driving each of the robotic arms. The object to be moved is represented as having a total mass that consists of the actual mass of the object to be moved plus the mass of the moveable arms that are rigidly attached to the moveable object. The arms are driven in a positive way by the hybrid control system to assure that each arm shares in the position/force applied to the object. The burden of actuation is shared by each arm in a non-conflicting way as the arm independently control the position of, and force upon, a designated point on the object.

14 Claims, 4 Drawing Sheets

METHOD AND APPARATUS FOR HYBRID POSITION/FORCE CONTROL OF MULTI-ARM COOPERATING ROBOTS

BACKGROUND OF THE INVENTION

1. Origin of the Invention

The invention described herein was made in the performance of work under a NASA Contract and is subject to the provisions of Public Law 96-517 (35 USC 202) in which the contractor has elected to retain title.

2. Field of the Invention

This invention relates to the field of automated control systems and more particularly to robotic arm control, including control loops for controlling two or more robot arms.

3. Description of the Prior Art

Dual- or multi-arm robots add extra dimensions to robotic applications. Such robots are known today and will be highly developed in the future. Many tasks can be performed wih the use of two or more robot arms that would be impossible to perform using a single robot arm. The numerous different applications for cooperating arms may be grouped into two categories.

In the first category all robot arms are in rigid contact with an object. The object may or may not be in contact with an environment. In the first-category case the task is either the transfer of large objects or a combination of transfer and force (torque) exertion by the object on an environment using two or more cooperating arms. The second category comprises those assembly tasks where each arm is holding a separate object. In this second-category case, unlike the first case, the robot arms do not form a complete closed kinematic link. The problem solved by this invention deals only with the first case, which finds widespread use in many practical applications such as material handling, parts assembly and disassembly.

A literature review of multi-arm robotics indicates that the reported research effort has dealt mostly with master/slave architecture. The literature does not teach or suggest the problem solved by the novel method and apparatus of this invention. The extension of developed theories in the areas of kinematics, dynamics, and control for single arm robots to the case of multi-arm robots, however, is far from trivial.

Previous work in dual-arm robots, for example, is reported in:

(A) Ishida, T., "Force Control in Coordination of Two Arms," *Proceedings of the 5th International Conference on Artificial Intelligence*, pp. 717-722, August 1977, (B) Fujii, S. and Kurono, S., "Coordinated Computer Control of a Pair of Manipulators," *Fourth World Congress on the Theory of Machines and Mechanisms*, University of Newcastle upon Tyne, Sept. 8-12, 1975, and (C) Alford, C. O. and Belyen, S. M. "Coordinated Control of Two Robot Arms," *Proceedings of the International Conference on Robotics*, Atlanta, Ga., Mar. 13-15, 1984.

Ishida considers a two-arm transport system where one arm is position controlled while the second arm follows the first one by way of compliance. The movements are restricted to either parallel or rotational motions, and the degree of cooperation in this method is not very clear. In other words, it is not explicit whether or not to what degree each arm carries the burden of transporting the object. Also, this Ishida method does not consider the case of interaction of the object with an environment.

Fujii and Kurono introduce the concept of "virtual reference." A unified equation is suggested in their method which, depending on the programmer, can result in force, position or master/slave (bilateral) control. Force control in this method is realized by specifying an offset beyond the motion limit. As such, the force is controlled through the position loop without using a force sensor, which results in an inaccurate force control. No compensation for the coupling between the joints is performed.

Alford and Belyen also present a master/slave type cooperation where two arms are position controlled. One arm is position servoed according to a preplanned trajectory. The second arm's desired trajectory is modified in real time based on the actual position of the first arm (master arm). An example is provided for the case of two arms moving in harmony but not holding a common object. It cannot be concluded from this example that the method will succeed when a closed loop kinematic link is formed by grasping a rigid object.

M. T. Mason in his report, entitled, "Compliance and Force Control for Computer Controlled Manipulators," *IEEE Transactions on Systems, Man, and Cybernetics SMC*-11, June 1981, pp. 418-432 also considered the problem of multiple effectors, and obtained natural constraints for each effector such that there would be no conflict using multiple effectors on the same rigid object. The theory developed by Mason on compliance and force control of robots is relevant to this invention. Mason's theory considers an ideal domain in which the manipulator is the ideal effector represented as a point in the position and force subspaces. Artificial and natural constraints are defined for an ideal point mass and a frictionless environment. The artificial constraints are used to specify the desired motion and force/torque in a non-conflicting manner in the ideal physical world.

Raibert and Craig in their reported work entitled "Hybrid Position/Force Control of Manipulators," *ASME Journal of Dynamics Systems, Measurement, and Control*, June 1981, utilized Mason's theory and developed the so-called "Hybrid Position/Force Control" technique. In this method, force and torque information is combined with position data to achieve the desired position and force/torque in a task-related frame.

This invention presents a novel extension to the hydrid control techniques discussed above and utilizes the basic position and force/torque concepts developed by Mason, Raibert and Craig. This invention is basically different from Mason, Raibert and Craig in that two or more arms are controlled in a closed kinematic loop.

SUMMARY OF THE INVENTION

As noted above, the prior art concentrated on a master-slave approach wherein, for example, a master arm pulls and the slave simply follows without contributing to the task. This invention departs from that conventional approach by providing a system free from any master or slave arm. Instead two or more robot arms each share in applying a scaled amount of force in order to move an object being controlled by the two or more robot arms to a desired position and orientation. The novel architecture of this invention provides hybrid position/force control of robots having a plurality of cooperating arms wherein each arm is controlled such that the burden of actuation is shared between the arms in a non-conflicting way as they control the position of, and force upon, a designated point on a mutually-held object. This invention is applicable whether or not the controlled object is in contact with a rigid external environment. The position control loops of this invention are based upon each manipulator's Cartesian space dynamic equations. In the position control subspace, a feature of this invention allows the robot arms to exert additional forces/torques to achieve compression, tension, or torsion in the object without affecting the execution of motion trajectories. In the force control subspace, the total force/torque magnitude square is minimized while realizing the net desired force/torque on the environment.

DETAILED DESCRIPTION OF THE DRAWINGS

Figure 1:
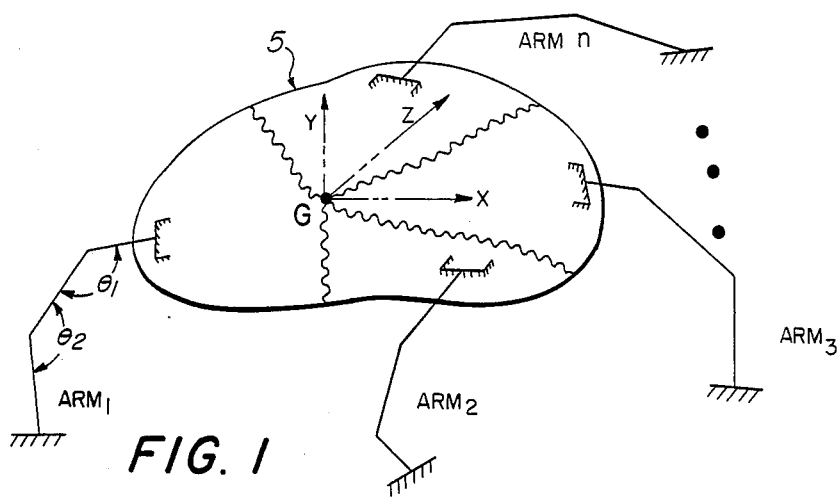
FIG. 1 is a schematic drawing of a multi-arm cooperating robot affecting a single object.

Consider the schematic drawing of FIG. 1 where n robot arms 1, 2, 3, ... n are shown gripping a single rigid object 5. In this analysis we will assume that the contact between each of the grippers at the ends of the arms and the object 5 is rigid. The main difference between this case and that of a single arm is that additional natural constraints are introduced due to the fact that all the grippers must be connected firmly to a rigid object. This means that the arms can exert forces or torques on each other without the object contacting an external environment. The arms must also move and apply forces in harmony in order to induce the desired motion to the object.

The problem posed by a multi-arm robot is more clearly understood if we reduce the workspace to a single degree-of-freedom (d.o.f.). The results can then be generalized to the full six d.o.f. position/orientation case.

The main ideas behind the present invention will first be discussed in connection with FIG. 2, for a very simple case, i.e., a point mass 20 which is either free to move along a straight line (one degree of freedom) or can exert a force in that direction. In either case, it is assumed that the point mass 20 is being controlled by two linear actuators 25, 30. The solutions obtained for these simple cases will then be generalized for a multi-arm robotic system.

Single-degree-of-freedom

Figure 5:
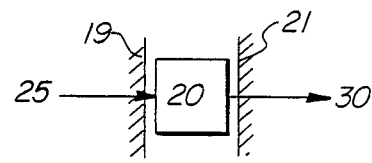
FIG. 5 depicts a constrained mass useful in understanding the development of equations explaining this invention.

Two separate ideal cases will be considered. (1) A single point mass 20, FIG. 2, rigidly attached to two single degree-of-freedom actuators 25, 30 (e.g. DC motors or hydraulic actuators). In this case we will assume that the motion of the point mass 20 is not resisted by any external force. (2) The same mass 20 and actuators 25, 30 of the first case, with the exception that the point mass 20, FIG. 5, is in contact with an external obstacle 19, 21 such that the point mass 20 is not free to move.

(1) Point Mass free to move

Figure 2:
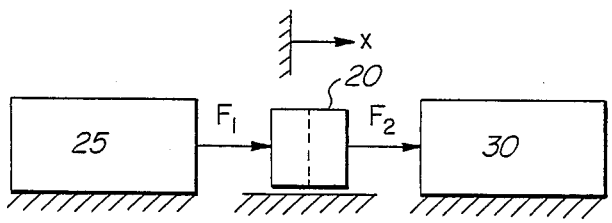
FIG. 2 is a schematic diagram of a two-actuator system.

FIG. 2 shows a schematic drawing for this configuration where mass 20 is free to move. $F_1$ and $F_2$ represent the total force acting on the point mass 20 and the combined inertia of the moving parts of the actuators 25, 30.

Figure 3:
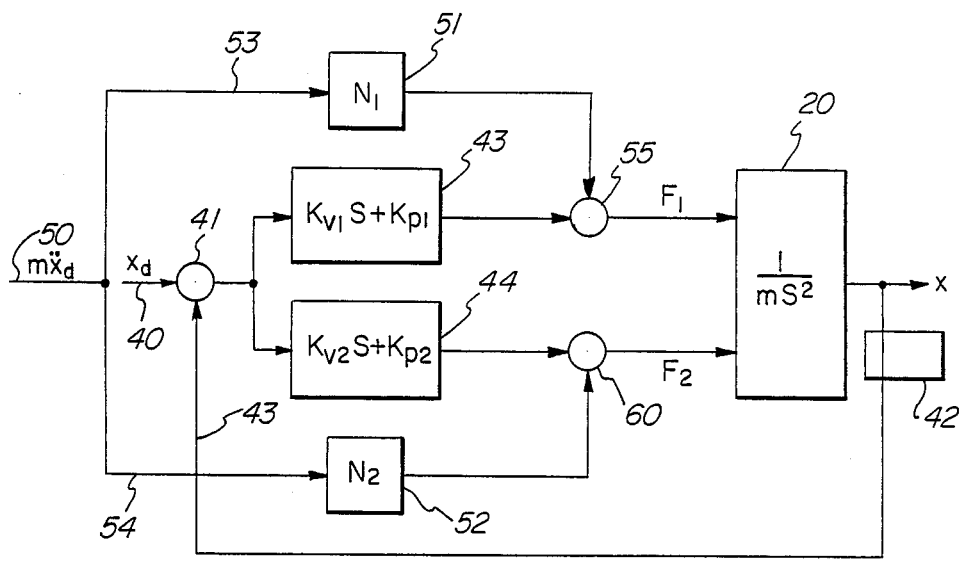
FIG. 3 is a schematic block diagram of a servo control loop for a two-actuator single degree of freedom system.

If the desired motion, x, of the point mass is specified by $x_d(t)$, then each of the servo systems can be controlled to induce this motion on the mass. The block diagram of FIG. 3 shows a servo control system for the combined system. In FIG. 3 the total mass is a combination of the mass 20 of the object to be moved and the moveable mass of the actuators 25, and 30. That total mass m, where $m = M_1 + M + M_2$, and $M_i$, with $i = 1, 2$ are the effective task space masses of the actuators and M is the mass of the point mass.

The total force applied on the equivalent mass is f, which is given by $$f = F_1 + F_2 \qquad (1)$$

$N_1$ and $N_2$ are real positive numbers with $N_1 + N_2 = 1$. The equation of motion of this system is given by $$m\ddot{x} = f = F_1 + F_2 = m\ddot{x}_d(N_1 + N_2) + (K_{v1} + K_{v2})(\dot{x}_d - \dot{x}) + (K_{p1} + K_{p2})(x_d - x) \qquad (2)$$

by defining $e = x_d - x$ and noting that $N_1 + N_2 = 1$, we have $$m\ddot{e} + (K_{v1} + K_{v2})\dot{e} + (K_{p1} + K_{p2})e = 0 \qquad (3)$$

As shown in FIG. 3 we are concerned about positioning the mass 20 which includes moving the total mass, m. When we want something to move, the control loop must specify distance, velocity and acceleration. Accordingly, the input signal to the control loop input terminal 50 is the term $m\ddot{x}_d$, which is the total mass times the desired acceleration, $\ddot{x}_d$. The values for scalers 51, 52, that is the values of $N_1$ and $N_2$, may be any predetermined amounts depending upon the value of the load to be shared. For example, in FIG. 2 if the mass 20 is divided in half, as shown by the dashed vertical line, it may be desired to have actuator 25 push 50% and actuator 30 pull 50%. This is by no means limiting since the scaler values may be any shared amount as desired for the situation. The scalers are connected in feed-forward loops 53, 54, which feed the scaled amount to summation points 55 and 60 for each actuator. A second input term to the servo loop is the desired distance, $x_d$, for the object to be moved. That second term is applied via input lead 40. A summing junction 41 is connected to input terminal 40 and receives a feedback signal from a distance sensor 42.

Sensor 42, as is well known, converts the actual movement x into an electrical signal that is applied at terminal 43 to the summation junction 41. An error signal e is developed at summation junction 41 and that error signal is applied to inputs of two controllers 43, 44 one each for each actuator. The controllers 43, 44 may be any well known proportional plus derivative or so-called ("PD") controllers. Such controllers act on the error signal and that error signal's derivative. In FIG. 3, as is well known in this art, the block 20 is a mathematical model which represents the mass to be moved and the moveable mass of the actuators. Forces $F_1$ and $F_2$ are shown simply as arrows, as is the actual movement x. Sensors, such as sensor 42, are to be understood in FIGS. 4 and 7 through 10 which figures show a dot connected at the output in the feedback loop for simplicity purposes.

The gains, k, shown in the equations for the PD controllers can be selected easily to obtain a critically damped system having a closed kinematic loop. With this design, in the ideal case where we have perfect tracking, the only force that is being exerted on the point mass is that which is required to achieve the desired motion.

Since there are two actuators, in accordance with my invention it is possible to exert additional forces on the point mass without affecting the motion. This is done by respectively adding and subtracting a force, $F_p$, to $F_1$ and from $F_2$.

$$F_1' = F_p + F_1 \quad (4)$$

$$F_2' = -F_p + F_2 \quad (5)$$

The total force acting on the system is still $$F_1' + F_2' = F_1 + F_2 = f$$

as before. The prime distinguishes the additional forces from those forces which act upon the mass to achieve positioning.

The absence of motion and the fact that the additional forces are in opposition to each other places the mass in compression. Such compression is very useful and is readily available with this invention. Tension is achieved in a mass by oppositely directed forces. Bending movements may also readily be achieved by offset forces while the object is motionless.

Figure 4:
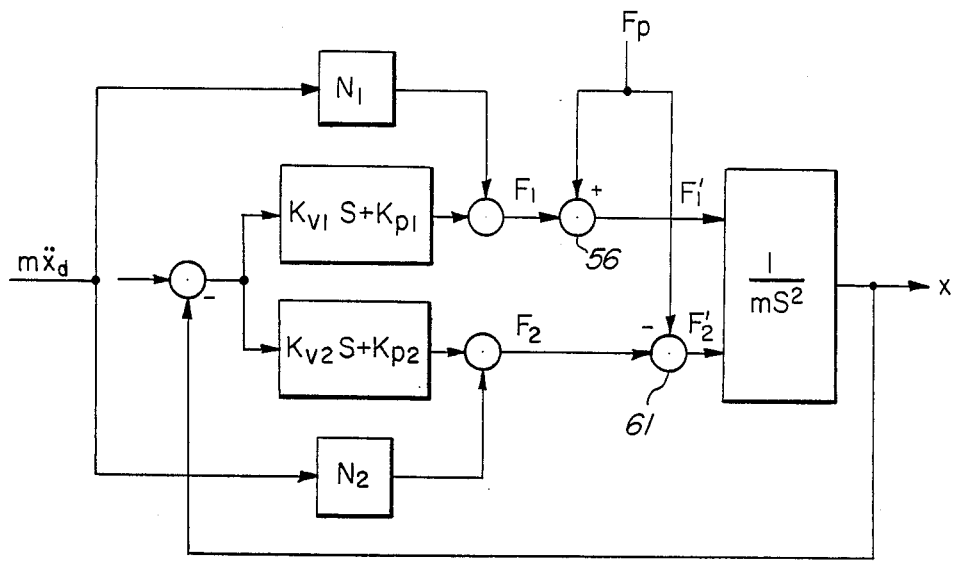
FIG. 4 is a schematic block diagram of a position/force controlled point mass using two linear actuators.

FIG. 4 shows the combined position and force control of the point mass using two actuators.

Comparison between FIG. 4 and FIG. 3 reveals that the control system of FIG. 3 is repeated in FIG. 4. Thus the motion equations, the identifying numbers and the earlier description given in connection with FIG. 3 applies equally as well to FIG. 4. In FIG. 4, however, each actuator loop additionally includes an extra summing junction 56, 61, which junctions are connected in the force loop positioning portion. The forces of $F_p$ are respectively added at junction 56 and subtracted at junction 61 to form a compression force within the object 20.

(2) Point mass constrained from movement

In this case, depicted in FIG. 5, we consider the configuration of a point mass 20 constrained between immovable environments 19 and 21. The direction of applied forces by the two actuators 25, 30 is as shown in FIG. 5. Let us assume that it is desired to apply a certain force, say $F_d$, by the actuators. We can do this directly because the object is constrained in the direction of the forces. Since there are two actuators we can apply a force equal to $F_1$ by actuator 25 and $F_2$ by actuator 30 as long as $$F_d = F_1 + F_2 \quad (6)$$

In equation (6), we have redundancy provided by dual actuators, and thus we are free to choose $F_1$ and $F_2$ arbitrarily so long as their sum is equal to $F_d$. In the case of a point mass it might be necessary to select $F_1$ and $F_2$ according to some criterion. For example, we might wish to minimize $$Q = F_1^2 + F_2^2 \quad (7)$$

which results in a unique solution given by $$F_1 = F_2 = F_d/2 \quad (8)$$

The criterion of equation (7) assures that we select one solution out of infinite many solutions with the property that the sum of the length of the force vectors is minimized. On the other hand, if we were applying $F_1$ and $F_2$ to the ends of a bar 60 of length l (See FIG. 6), then $F_1$ and $F_2$ might be chosen to achieve a desired tension or compression in various cross sections of the bar while satisfying equation (6).

Figure 6:
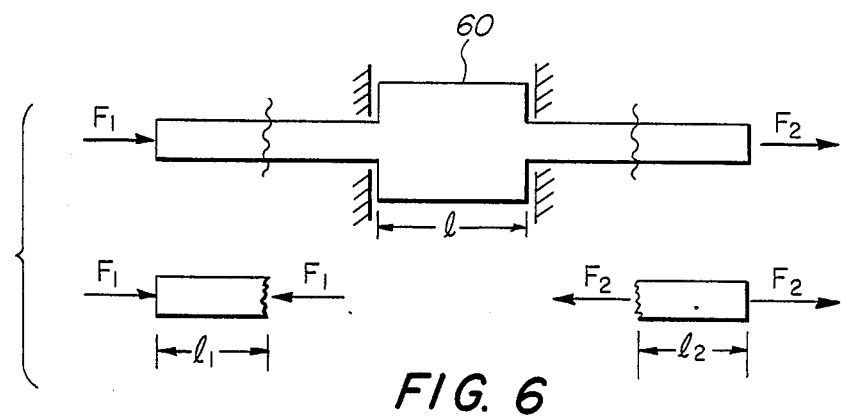
FIG. 6 depicts selection of $F_1$ and $F_2$ for a bar and is useful in understanding the development of equations explaining this invention.
Figure 7:
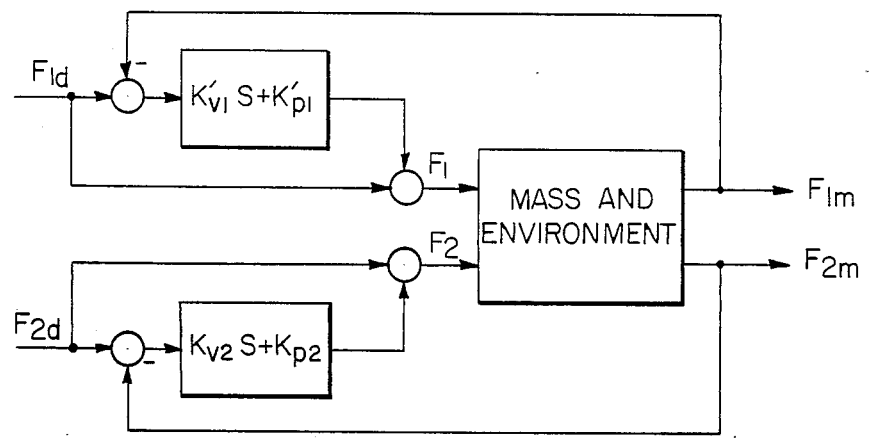
FIG. 7 is force control block diagram of a constrained mass using two actuators.

The lower bar in FIG. 6 shows that equal portions $l_1$, $l_2$, which are half of the extended portions beyond the immovable mass 60, become subject to tension and compression respectively. A force control architecture of FIG. 7 can be used to achieve the desired forces $F_1$ and $F_2$ by utilizing force sensors for the actuators.

The basic ideas developed in connection with FIGS. 1 through 7 are generalized for the case of a general rigid mass which is being held by n robot arms which may or may not be in contact with a rigid environment.

Assume that a point, say G, FIG. 1, is specified on the object 5 whose motion and/or contact forces (torques) with the environment is/are to be controlled by generating appropriate torques (for revolute joints) or forces (for prismatic joints) in the joints of the robot arms. First, a task related coordinate frame is defined such that natural and artificial constraints can be specified for point G. The natural constraints are dictated by the environment and the object, i.e. the physical parameters of the problem. Artificial constraint defines what must be done to move the object. Six dimensions must be specified—three dimensions are directional, commonly referred to as x, y and z; and three dimensions are orientational, commonly called roll, pitch and yaw. This six dimensional frame is the so-called constraint frame. Such a frame might be attached to the environment or to the object depending on the specific task at hand.

Now consider an ideal homogeneous C-surface for point G. The homogeneous C-surface as defined by Mason corresponds to a real-world task space where there is no friction force tangent to the surface and the surface is infinitely rigid. No unilateral constraints are permitted, which means that constraints which prevent motion in one direction, but not the opposite direction, are not allowed.

Let $S_v$ and $S_f$ represent the position and force natural constraint subspaces for point G, respectively. This means that the C-surface is such that the point G can move only in the vector subspace spanned by $S_f$ and, similarly, the interaction between the object and the environment is such that contact forces (torques) can only exist in the vector space spanned by $S_v$. For ideal C-surfaces, we have $(S_v)\perp = S_f$ and $(S_f)\perp = S_v$, wherein "$\perp$" means perpendicular or orthogonal. The artificial constraint subspaces are $S_f$ and $S_v$ for position and force, respectively.

In light of the material discussed earlier for a single point mass, we can control the position of G in $S_f$ subspace by generalizing the block diagram of FIG. 4. We can specify $N_1, N_2, \ldots N_n$ so long as $$\sum_{i=1}^{n} N_i = 1$$

This ensures that the feedforward force is specified such that in the ideal case the desired acceleration is realized. $\underline{F}_{pd}$ can also be introduced in order to realize desired forces and torques to be applied to the object in addition to those forces which move the object.

Let us first develop the meaning for $N_1, \ldots N_n$. Since each robot arm's end-effector is rigidly connected to the object we will consider a "portion" of this object as a part of the last link of each robot arm. We can then use the Cartesian dynamics equation to compute the forces and torques required at point G to induce the desired motion. For example, if $\underline{\ddot{x}}_d$ is the desired acceleration vector in the $S_f$ vector space at the constraint frame for point G, then considering only one of the arms, (e.g., arm i) the Cartesian force vector at point G is given as $$F_i = M_x(\underline{\theta}_i)\underline{\ddot{x}}_d + V_x(\underline{\theta}_i, \underline{\dot{\theta}}_i) + G_x(\underline{\theta}_i) \quad (9)$$

In equation (9), $M_x$ is the nxn Cartesian mass matrix, $V_x$ is the vector of velocity terms in Cartesian space, $G_x$ is the Cartesian gravity term, the subscript x indicates a Cartesian reference rather than individual joints of linkages of the arm and $\theta_i$ is a six dimensional vector whose components are the joint angles of arm i (see angles of motion in FIG. 1). $M_x$, $V_x$, and $G_x$ are related to their counterparts in the joint space by $$M_x(\underline{\theta}_i) = J^{-T}(\underline{\theta}_i) M(\underline{\theta}_i) J^{-1}(\underline{\theta}_i) \quad (10)$$

$$V_x(\underline{\theta}_i, \underline{\dot{\theta}}_i) = J^{-T}(\underline{\theta}_i)[V(\underline{\dot{\theta}}_i, \underline{\theta}_i) - M(\underline{\theta}_i)J^{-1}(\underline{\theta}_i)\dot{J}(\underline{\theta}_i)\underline{\dot{\theta}}_i] \quad (11)$$

$$G_x(\underline{\theta}_i) = J^{-T}(\underline{\theta}_i) G(\underline{\theta}_i) \quad (12)$$

Note that the Jacobian is computed for the constraint frame and not for the end-effector frame.

Since we want the object's inertia to be shared by all the arms, $M_x$, $V_x$, and $G_x$ for each arm must be computed by taking into account a gripped portion of the object, as sympolized by the light wavy lines of FIG. 1. For example, if the mass and inertia tensor of the object relative to its center of mass are M and I, respectively, we may partition these quantities as $$M = \sum_{i=1}^{n} N_i^m M \quad (13)$$

$$I = \sum_{i=1}^{n} N_i^I I \quad (14)$$

where $N_i$'s are positive scalars satisfying $$\sum_{i=1}^{n} N_i^m = \sum_{i=1}^{n} N_i^I = 1 \quad (15)$$

Next, we have to obtain the mass and inertia tensor of the last link for each of the arms by adding $N_i^m M$ and $N_i^I I$ to them. This is done by obtaining the center of mass and the inertia tensor of the composite link consisting of the last link of arm i, the end-effector, and a gripped portion of the object.

Figure 8:
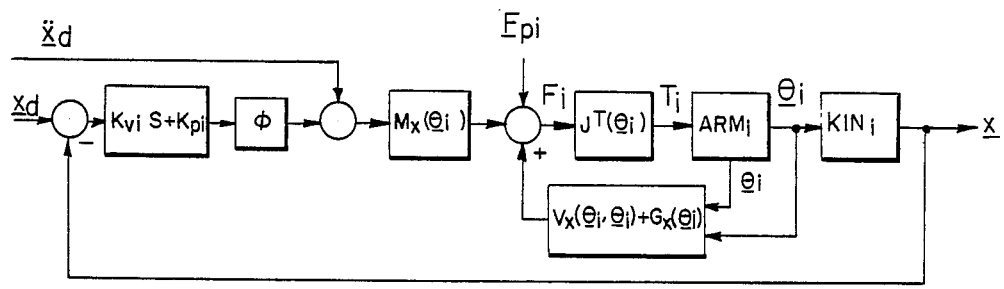
FIG. 8 is a block diagram schematic of a position control loop for arm i.

Following the same discussion given for the point mass, and utilizing the concept of the selector matrix to exclude the feedback errors in the force subspace, we can obtain a block diagram for the position loop of arm i as shown in FIG. 8. This control loop is similar to the Cartesian space version of the well-known computed torque technique as described in Craig, J. J., *Introduction to Robotics: Mechanics and Control*, Addison-Wesley, 1985.

In FIG. 8, $\phi$ is the selection matrix as defined by $S_v$. $M_x$, $V_x$, and $G_x$ are computed using the mass property of arm i except for the last link where a portion of the object's mass and inertia tensor have been added. $\underline{F}_{pi}$ is a force vector which will be exerted by arm i in cooperation with the other arms such that the net effect at point G is zero. In an ideal case these $\underline{F}_{pi}$'s will not affect the motion but will realize the desired internal forces and torques in the object.

The second part of the hybrid position/force architecture is the force loop. As was mentioned in the single degree of freedom case, a criterion must be defined to deal with the redundancy in applying force (torque) in the $S_v$ subspace. Let $\underline{F}_{ig}$ denote the force vector applied by arm i at point G in the $S_v$ subspace. If the required net force is $\underline{F}_g$, we then have $$\underline{F}_g = \sum_{i=1}^{n} \underline{F}_{ig} \quad (16)$$

Now suppose we wish to minimize the force magnitude square with W weighing or $$\text{Min } Q = \underline{F}^T W \underline{F} \quad (17)$$

where $$\underline{F} = \begin{bmatrix} \underline{F}_{ig} \\ \cdot \\ \cdot \\ \cdot \\ \underline{F}_{ng} \end{bmatrix}, \quad W = \text{diag}(w_1, w_2, \ldots w_n) \quad (18)$$

Equation (16) may be written as $$[I:I \ldots :I] \begin{bmatrix} \underline{F}_{ig} \\ \cdot \\ \cdot \\ \cdot \\ \underline{F}_{ng} \end{bmatrix} = \underline{F}_g \quad (19)$$

or $$H\underline{F} = \underline{F}_g \quad (20)$$

It is now straightforward to solve for $\underline{F}_{ig}$, $i = 1, \ldots n$ while minimizing Q. $\underline{F}$ is given by $$\underline{F} = W^{-1} H^T (H W^{-1} H^T)^{-1} \underline{F}_g \quad (21)$$

By substituting for W and H from (18) and (19) we obtain $$\underline{F}_{ig} = W_i^{-1} \left( \sum_{i=1}^{n} W_i^{-1} \right)^{-1} \underline{F}_g, \quad i = 1, \ldots, n \tag{22}$$

The above computations result in a solution to the particular problem as posed by equations (16) and (17). The purpose of developing the force loop is to give a control architecture such that the $F_{ig}$'s can be realized by n arms without interfering with the position loop's solutions. A typical force loop to realize $\underline{F}_{ig}$ at point G is shown in FIG. 9.

Figure 9:
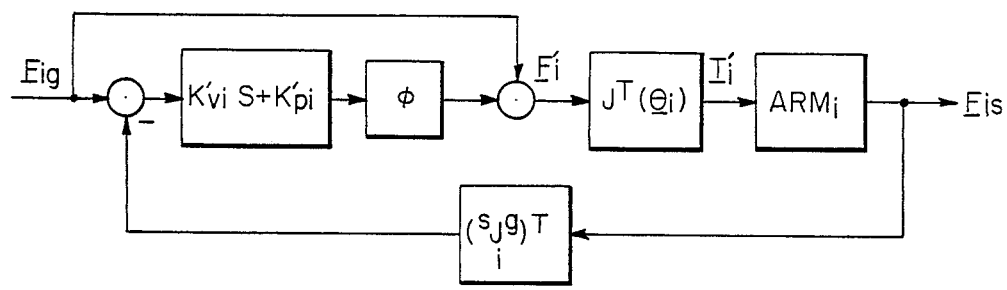
FIG. 9 is a schematic block diagram of a force control loop for arm i.
Figure 10:
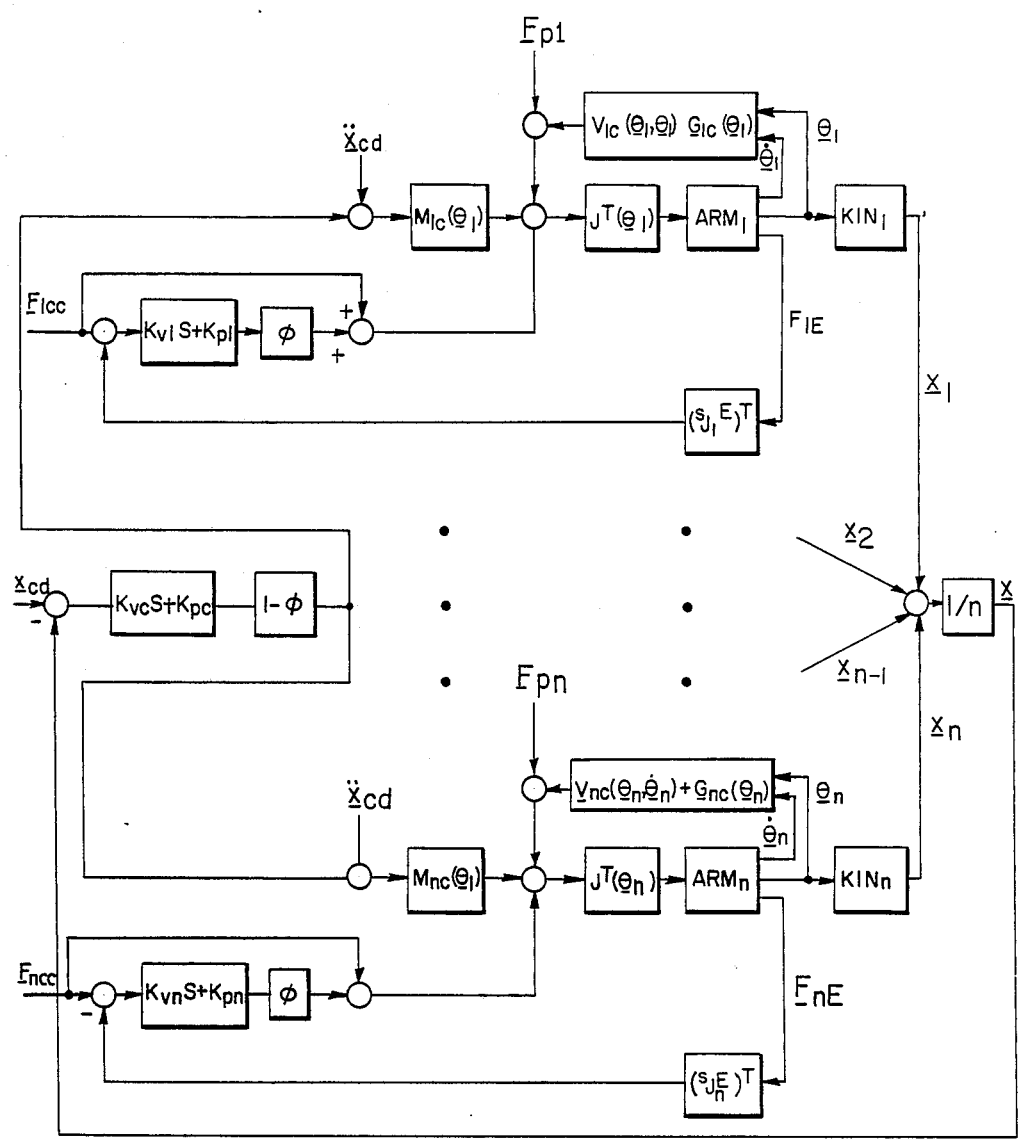
FIG. 10 is a schematic block diagram of a position/force hybrid control for a multi-arm cooperating robot.

Using FIGS. 8 and 9, a combined position/force control architecture is now constructed for n arms, as shown in FIG. 10.

The control architecture of FIG. 10 has a very important desirable feature. From a computational point of view, it is ideal for a distributed computer architecture, wherein each arm is controlled by a dedicated microprocessor. Using the proposed method, the number of mathematical operations increases only linearly with the number of cooperating arms, therefore, there is not a limit on the number of arms. The stability of the system is guaranteed as long as a precise knowledge of the mass property of the arms as well as the object is available. The requirement on knowledge of the object's mass property may be relaxed if the object is much less massive than the arms.

In extreme cases, i.e., when either the position constraint space, $S_v$, or the force constraint subspace, $S_f$, is the null space, the control system results in either a pure cooperative transport or compliant multi-arm robotic system.

In this application a control architecture for position/force-torque control of n cooperating arms has been defined. Unlike a method suggested by Mason for multiple grippers, which involves obtaining natural and artificial constraints for each gripper frame, the present method simplifies the problem considerably by artificially extending the arms to the origin of the compliant frame, i.e., point G. In this case, the position artificial constraint is identical for all of the arms. The cooperation becomes an algebraic problem. We must decide how much each arm should contribute to the motion of the object. This is accomplished by partitioning the mass and inertia tensor of the object into n parts. The artificial force constraint for each arm is obtained from the artificial force constraint at the same common point on the object, point G, by a partitioning method. An example was given in which the forces to be exerted by each arm were computed by minimizing a performance index. The control architecture is well suited for a distributed computer architecture.

Although the present invention has been fully described by way of example with reference to the accompanying drawings, it is to be noted here that various changes and modifications will be apparent to those skilled in the art. Therefore, unless such changes and modifications depart from the present invention, they should be construed as included therein.

What is claimed is:

1. A control system for a plurality n of moveable robot arms 1, 2, 3 . . . n each having joints and joint angles between a moving source and an end effector for each arm, said system cooperating to move an object through a distance x, which object, together with the moveable robot arms, has a total mass, which is resolved into a point mass M having an origin point G in Cartesian space wherein the object can move in a vector subspace spanned by $S_v$ and $S_f$, which represent the position and force natural constraint subspaces for point G, respectively in that Cartesian space, said system comprising:

a plurality of end effectors, one each for each of said robot arms, rigidly connected to the object to be moved, said object characterized as being partitioned into a plurality of portions radiating from the point G and including the portion of the object which is connected to each robot arm, with each robot arm being treated as though it includes a portion of the object radiating from the origin point G to the rigid connection for each arm; and means for applying to said object by each of said robot arms, i, a positive force acting on said object by each of said robot arms in a shared and non-conflicting manner, with each force moving a designated robot arm and its associated portion of the object, said force being defined as $$F_i = M_x(\theta_i)\ddot{x}_d + V_x(\theta_i, \dot{\theta}_i) + G_x(\theta_i),$$

wherein $M_x$ is the nxn Cartesian mass matrix of the ith arm and its gripped, radiating portion of the object, $V_x$ is the vector of velocity terms in Cartesian space for the velocity of the object, $G_x$ is the Cartesian gravity term of the ith arm and its gripped, radiating portion of the object, the subscript x indicates Cartesian reference rather than individual joints of linkages of the robotic arm, i, $\theta_i$ is a six dimensional vector whose components are the joint angles of robot arm i, $\ddot{x}_d$ is the desired acceleration vector of the object in the $S_f$ vector subspace, and the three translational dimensions and the three rotational dimensions, through which the object may move, are defined as the constraint frame for point G of the object.

2. A control system for robotic arms which cooperate to move an object, comprising:

two or more arms each rigidly connected by its end-effector to said object, said object characterized by being represented by a center of gravity point G for a total mass that includes the mass of all the moveable robot arms plus the mass of the object, with each arm treated as though it includes a portion of the object radiating from the center point G to the rigid connection for each arm;

means for sharing between said arms a positive driving force applied by said arms to said object according to a scaler $N_1, N_2 \ldots N_n$ for the arms so long as $$\sum_{i=1}^{n} N_i = 1$$

and $N_1, N_2 \ldots N_n$ are scalers in a feedforward control loop for a positioning force applied by said arms to said object.

3. A control system in accordance with claim 2 and further comprising means for applying additional forces by each of said arms to place said object in internal tension, compression or torque without affecting the positioning of said object.

4. A control system for robotic arms which cooperate to move an object, comprising:

two or more arms each rigidly connected by its end-effector to said object;

means for sharing between said arms a positive driving force applied by said arms to said object according to a scaler $N_1, N_2 \ldots N_n$ for the arms so long as $$\sum_{i=1}^{n} N_i = 1$$

wherein $N_1, N_2 \ldots N_n$ are scalers in a feedforward control loop for a positioning force applied by said arms to said object;

means for applying additional internal forces by each of said arms to place said object in internal tension, compression or torque without affecting the positioning of said object;

means for adding a signal representative of the share of said internal force by a given arm to the output of said feedforward positioning loop for said arm; and means for applying both positional and internal forces to said arm for application to said object.

5. A control system in accordance with claim 4 and further comprising a rigid environment; and said arms exert positional forces and internal forces between said object and said environment.

6. A controller system for a plurality of n robot arms 1, 2, 3 ... n each having joint angles and each rigidly connected by its end-effector to a object to be moved through m possible dimensions into a desired distance and orientation in Cartesian space, which object is assigned a single origin point G and a task related coordinate frame having natural and artificial constraints specified for the point G, and including an m-dimensional vector subspace spanned by $S_v$ and $S_f$ which represent, respectively, the position and force natural constraint subspaces of a constraint frame for point G, which object may or may not be in contact with an environment, said controller comprising:

an input terminal for receiving a signal indicative of the desired acceleration vector, $\ddot{x}_d$, in the m-dimensional $S_f$ vector subspace at the constraint frame for point G, means for developing a Cartesian force vector at point G from a positive nonconflicting force applied by each arm, i, wherein each arm grips an associated portion of the object with the gripped portion radiating from the origin point G, and the arm is treated as though it includes the gripped portion of the object, said cartesian force being defined as $$F_i = M_x(\theta_i)\ddot{x}_d + V_x(\theta_i, \dot{\theta}_i) + G_x(\theta_i),$$

wherein $M_x$ is the n times m Cartesian mass matrix for the gripped, radiating portion of the object and the ith arm, $V_x$ is the vector of velocity terms for the object in Cartesian space, $G_x$ is the Cartesian gravity term for the gripped, radiating portion of the object and the ith arm, the subscript x indicates Cartesian reference rather than individual joints of linkages of the robotic arm, i, $\theta_i$ is an m-dimensional vector whose components are the joint angles of arm i;

means for developing a signal indicative of actual movement by said object in each of said m-dimensional directions; and feedback means for applying said developed signal to null out said desired acceleration signal at said input terminal.

7. A method of controlling a plurality of robot arms each adapted with joints and joint angles for movement, and each having a gripping end effector, with all robot arms cooperating to move an object in Cartesian space by a distance x, said method comprising the steps of:

partitioning the object relative to an origin point, G, on the object into a plurality of portions, each portion radiating from the object's origin point G, and being associated for movement by a gripping end effector;

gripping each radiating portion of the object by an end effector which is designated to move that gripped portion;

assigning the mass of each arm and the mass of its gripped portion as the total mass to be moved by that arm;

applying to said object by each of said arms i, a force defined as $$F_i = M_x(\theta_i)\ddot{x}_d + V_x(\theta_i, \dot{\theta}_i) + G_x(\theta_i),$$

wherein $M_x$ is the nxn Cartesian mass matrix of the gripped radiating portion of the object and the ith arm, $V_x$ is the vector of velocity terms in Cartesian space wherein the object can move in a vector subspace spanned by $S_v$ and $S_f$, which represent the position and force natural constraint subspaces for point G, respectively, in that Cartesian space, $G_x$ is the Cartesian gravity term of the gripped, radiating portion of the object and the ith arm, the subscript x indicates Cartesian reference rather than individual joints of linkages of the robotic arm, i, $\theta_i$ is a six dimensional vector whose components are the joint angles of arm i, and $\ddot{x}_d$ is the desired acceleration vector in the $S_f$ vector subspace, and the three translational and the three rotational dimensions through which the object may move are defined as the constraint frame for point G of the object.

8. A method for controlling robotic arms which cooperate to move an object in accordance with claim 7 and, comprising the additional step of sharing between said arms a positive driving force applied by said arms to said object according to a scaler $N_1, N_2 \ldots N_n$ for the arms so long as $$\sum_{i=1}^{n} N_i = 1.$$

9. A method in accordance with claim 8 and comprising the additional step of placing the scalers in a feedforward control loop for developing a positioning force applied by said arms to said object.

10. A method in accordance with claim 9 and comprising the further step of applying additional forces by each of said arms to said object without affecting the positioning of said object.

11. A method in accordance with claim 10 and comprising the additional step of applying each additional force in opposition to the other forces to place said object in compression.

12. A method in accordance with claim 10 and comprising the additional step of applying each additional force in opposition to the other forces to place said object in tension.

13. A method in accordance with claim 10 and comprising the additional steps of
   applying some of said forces to said object in opposition with each other;
   placing said opposing forces on different places on said object to create an internal torque within said object.

14. A method in accordance with claim 8 and comprising the further steps of
   placing said object against a rigid environment; and
   exerting positional and internal forces between said object and said environment.

* * * * *

UNITED STATES PATENT AND TRADEMARK OFFICE
CERTIFICATE OF CORRECTION

PATENT NO. : 4,826,392

DATED : May 2, 1989

INVENTOR(S) : Samad A. Hayati

It is certified that error appears in the above-identified patent and that said Letters Patent is hereby corrected as shown below:

Column 2, lines 47 and 48, "hydrid" should read --hybrid--.

Column 5, line 14, "k" should read --K--.

Column 8, line 62, "i=1,...n" should read --i=1,....n--.

Column 10, line 28, "its" should read --it's--.

Column 10, line 51, "$N_2...N_n$" should read --$N_2.....N_n$--.

Column 11, line 32, "a" should read --an--.

Column 11, line 66, "$\Theta_i$" should read --$\underline{\Theta}_i$--.

Column 12, line 30, "gripped radiating" should read --gripped, radiating--.

Column 12, line 50, "$N_2...N_n$" should read --$N_2 ....N_n$--.

Signed and Sealed this

Twenty-third Day of October, 1990

Attest:

HARRY F. MANBECK, JR.

Attesting Officer

Commissioner of Patents and Trademarks